(12) United States Patent
East (10) Patent No.: US 7,593,743 B2
(45) Date of Patent: Sep. 22, 2009

(54) METHODS, SYSTEMS, AND COMPUTER PROGRAM PRODUCTS FOR UPDATING AVAILABILITY INFORMATION IN VOICE-CALL APPLICATIONS

(75) Inventor: Allen M. East, Cary, NC (US)

(73) Assignee: Sony Ericsson Mobile Communications, AB, Lund (DE)

( * ) Notice: Subject to any disclaimer, the term of this patent is extended or adjusted under 35 U.S.C. 154(b) by 659 days.

(21) Appl. No.: 11/003,153

(22) Filed: Dec. 3, 2004

(65) Prior Publication Data

US 2006/0121923 A1    Jun. 8, 2006

(51) Int. Cl.
*H04Q 7/20* (2006.01)
*H04B 7/00* (2006.01)
*H04M 3/42* (2006.01)

(52) U.S. Cl. ...................... 455/519; 518/416

(58) Field of Classification Search ......... 455/517–519, 455/521, 414.1, 414.2, 416; 370/352, 312
See application file for complete search history.

(56) References Cited

U.S. PATENT DOCUMENTS

| | | | | |
|---|---|---|---|---|
| 6,527,641 | B1 * | 3/2003 | Sinclair et al. | 463/39 |
| 6,554,707 | B1 * | 4/2003 | Sinclair et al. | 463/39 |
| 6,763,226 | B1 * | 7/2004 | McZeal, Jr. | 455/90.2 |
| 6,781,963 | B2 * | 8/2004 | Crockett et al. | 370/260 |
| 6,873,854 | B2 * | 3/2005 | Crockett et al. | 455/518 |
| 6,898,436 | B2 * | 5/2005 | Crockett et al. | 455/518 |
| 7,155,248 | B2 * | 12/2006 | Idnani | 455/519 |
| 7,269,433 | B2 * | 9/2007 | Vargas et al. | 455/502 |
| 7,315,747 | B2 * | 1/2008 | Klassen et al. | 455/466 |
| 2003/0065788 | A1 | 4/2003 | Salomaki | |
| 2003/0131142 | A1 | 7/2003 | Horvitz et al. | |
| 2004/0162882 | A1 | 8/2004 | Mora | |
| 2005/0113134 | A1 * | 5/2005 | Bushnell et al. | 455/555 |
| 2005/0154681 | A1 * | 7/2005 | Schmelzer | 705/67 |
| 2006/0088065 | A1 * | 4/2006 | Khatter | 370/528 |
| 2006/0116149 | A1 * | 6/2006 | Dunn et al. | 455/518 |

OTHER PUBLICATIONS

Press Release: "Alcatel Launches its Push to Talk Application as an Integrated Part of its IP Multimedia Communication Portfolio," Apr. 28, 2004, www.home.alcatel.com/vpr/vpr.nsf/DateKey/28042004_luk.

Press Release: Live Demonstrations of Voice Instant Messaging Over a 3G Network, Dec. 3, 2002, www.3g.co.uk.PR/December2002/4524.htm.

(Continued)

*Primary Examiner*—Tilahun B Gesesse
(74) *Attorney, Agent, or Firm*—Myers Bigel Sibley & Sajovec, P.A.

(57) ABSTRACT

A method of updating user availability information in a voice-call application executing on a mobile terminal includes automatically retrieving user activity information from an activity application and updating the user availability information for the voice-call application based on the retrieved user activity information. The voice-call application may be a push-to-talk (PTT) application, and updating the user availability information may include correlating the retrieved activity information to PTT availability information and updating the user availability information with the PTT availability information. Related systems and computer program products are also discussed.

29 Claims, 4 Drawing Sheets

OTHER PUBLICATIONS

Schulzrinne et al. "RPID: Rich Presence Extensions to the Presence Information Data Format (PIDF)," *IETF* 5:5-15 (2004).

J. Rosenberg "A Data Model for Presence", *IETF* pp. 1-36 (2004).

Notification of Transmittal of the International Search Report and The Written Opinion of the International Searching Authority, or the Declaration, corresponding to PCT/US2005/026244 mailed Dec. 1, 2005.

* cited by examiner

METHODS, SYSTEMS, AND COMPUTER PROGRAM PRODUCTS FOR UPDATING AVAILABILITY INFORMATION IN VOICE-CALL APPLICATIONS

FIELD OF THE INVENTION

The present invention relates to communications networks, and, more particularly, to communicating availability information between devices in a communications network.

BACKGROUND OF THE INVENTION

Personal communication devices are becoming more widely adopted by the public. Devices such as cellular phones, personal digital assistants, and laptop computers give users a variety of mobile communications and computer networking capabilities. In recent years, personal communication devices have implemented capabilities for supporting additional types of communications applications that allow for real-time or near real-time communication outside of traditional voice communication using a wide variety of multimedia formats, including text, voice, music, and video.

Push-To-Talk (PTT) is a real-time voice-based communication service that allows personal communication devices to operate as a "walkie talkie". Push-to-talk may be implemented as a half-duplex channel that is shared by all of the participants of a push-to-talk session. For example, a PTT-enabled mobile terminal may send a page to a network server to request establishment of a push-to-talk session with a remote user in response to a dialed number. Once the push-to-talk session has been activated, either participant may send a floor request (a request to use the half-duplex channel) by pushing a button on their mobile terminal. The network server may indicate that the floor request has been granted by, for example, an audio tone. Once the user has been granted the floor, he may broadcast speech over the channel by talking while holding in the button. Release of the button may release the floor, so that the half-duplex channel may then be used by another participant to the call or remain idle. While the push-to-talk session is active, it provides the user and remote user(s) an instant talk capability for communicating with each other. The push-to-talk session may be established between two users (point-to-point) or between three or more users (group talk). Push-to-talk sessions may be implemented over both packet-switched and circuit switched networks.

Instant messaging is another type of communications service that enables users of personal communications devices to communicate in real time over the Internet using text-based messages. In a typical instant messaging application, for example, AOL Instant Messenger (IM), a user may prepare and transmit a text message for delivery to one or more other users, typically on a so-called "buddy list." The user may receive messages from members of the buddy list in a similar manner. In instant messaging applications, it is known to provide appointment/status information from personal information manager (PIM) software to the instant messenger, which may pass this status information to identified buddies.

SUMMARY OF THE INVENTION

Some embodiments of the present invention provide method, devices and computer program products for updating user availability information in a voice-call application. According to some embodiments, a method of updating user availability information in a voice-call application executing on a mobile terminal includes automatically retrieving user activity information from an activity application and updating the user availability information for the voice-call application based on the retrieved user activity information.

In other embodiments, the voice-call application may be a push-to-talk (PTT) application, and updating the user availability information may include correlating the retrieved activity information to PTT availability information and updating the user availability information with the PTT availability information.

In some embodiments, automatically retrieving user activity information may include automatically retrieving user activity information from a calendar and/or task application executing separately from the PTT application.

In other embodiments, correlating the retrieved activity information may include correlating the retrieved activity information to future PTT availability information, and updating the user availability information may include updating the user availability information with the future PTT availability information at a corresponding future time.

In further embodiments, the activity application may be executing on a personal computer, and automatically retrieving the user activity information and updating the user availability information may be performed by the mobile terminal.

In other embodiments, the method may further include transmitting the PTT availability information to the mobile terminal. The activity application may be executing on a personal computer, and automatically retrieving activity information and correlating the retrieved activity information to PTT availability information may be performed by the personal computer. In further embodiments, automatically retrieving activity information and correlating the retrieved activity information to PTT availability information may be performed by a central server that is configured to communicate with the personal computer and the mobile terminal.

In some embodiments, the method may further include transmitting the retrieved activity information from a personal computer to the mobile terminal. The activity application may be executing on a personal computer, and automatically retrieving user activity information may be performed by the personal computer, while updating the user availability information may be performed by the mobile terminal.

In other embodiments, updating the user availability information may include updating a PTT presence status indicator in the PTT application.

In further embodiments, updating the user availability information may be performed when the mobile terminal is in an active mode of operation and/or a standby mode of operation.

In some embodiments, the method may further include obtaining user preference information, and updating the user availability information may further include distributing a selected subset of the user availability information to other users based on the preference information.

In other embodiments, the preference information may include a respective level of trust and/or level of detail preference associated with each of the other users, and updating the user availability information may further include distributing the selected subset of the user availability information based on the level of trust and/or level of detail preferences for each of the other users.

In further embodiments, the preference information may include correlation preferences, and updating the user availability information may further include correlating the retrieved activity information to the user availability information based on the correlation preferences.

In some embodiments, automatically retrieving user activity information and updating the user availability information may include automatically retrieving the user activity information and updating the user availability information responsive to at least one of a radio signal, an infrared signal, and a synchronization signal.

In other embodiments, the method may further include receiving an indication of changes to the user activity information, and automatically retrieving the user activity information and updating the user availability information may be responsive to the received indication.

In further embodiments, automatically retrieving the user activity information and updating the user availability information may include automatically retrieving the user activity information and updating the user availability information at predetermined times.

According to some embodiments of the present invention, a system for updating user availability information in a voice-call application executing on a mobile terminal may include an availability application configured to automatically retrieve user activity information from an activity application and update the user availability information for the voice call application based on the retrieved activity information.

In some embodiments, the voice-call application may be a push-to-talk (PTT) application, and the availability application may include a correlation module configured to correlate the retrieved activity information to PTT availability information and update the user availability information with the PTT availability information.

In other embodiments, the availability application may include a retrieval module configured to automatically retrieve user activity information from a calendar and/or task application executing separately from the PTT application.

In further embodiments, the system may include an interface module configured to obtain user preference information, and the availability application may be further configured to distribute a selected subset of the user availability information to other users based on the preference information.

In some embodiments, the availability application may be configured to retrieve the user activity information from an activity application executing on the mobile terminal and/or on a personal computer.

In other embodiments, the availability application may further be configured to update the user availability information when the mobile terminal is in an active mode of operation and/or a standby mode of operation.

In further embodiments, a system for updating user availability information in a voice-call application executing on a mobile terminal may include means for automatically retrieving user activity information and means for updating the user availability information for the voice-call application based on the retrieved activity information.

According to some embodiments of the present invention, a computer program product for updating user availability information in a voice-call application executing on a mobile terminal may include a computer readable storage medium having computer readable program code embodied in said medium. The computer readable program code may include computer readable program code that automatically retrieves user activity information from an activity application and computer readable program code that updates the user availability information for the voice-call application based on the retrieved activity information.

In some embodiments, the voice-call application may be a push-to-talk (PTT) application, and the computer readable program code that updates the user availability information may include computer readable program code that correlates the retrieved activity information to PTT availability information and computer readable program code that updates the user availability information with the PTT availability information.

In other embodiments, the computer readable program code that automatically retrieves activity information may include computer readable program code that automatically retrieves activity information from a calendar and/or task application executing separately from the PTT application.

In further embodiments, the computer readable program code that correlates the retrieved activity information may correlate the retrieved activity information to future PTT availability information, and the computer readable program code that updates the user availability information may update the user availability information with the future PTT availability information at a corresponding future time.

In some embodiments, the computer program product may further include computer readable program code that obtains user preference information, and the computer readable program code that updates the user availability information may further include computer readable program code that distributes a selected subset of the user availability information to other users based on the preference information.

In other embodiments, the computer readable program code that updates the user availability information may update the user availability information when the mobile terminal is in an active mode of operation and/or a standby mode of operation.

According to some embodiments of the present invention, a method of updating push-to-talk (PTT) presence information in a push-to-talk application executing on a mobile terminal may include obtaining user preference information, automatically retrieving user activity information from a calendar and/or task application executing on a personal computer, and transmitting the retrieved activity information from the personal computer to the mobile terminal. The method may further include determining availability information based on the retrieved activity information, updating the PTT presence information with the availability information, and distributing a selected subset of the PTT presence information to other users based on the preference information.

DETAILED DESCRIPTION OF EMBODIMENTS OF THE INVENTION

The present invention now will be described more fully hereinafter with reference to the accompanying figures, in which illustrative embodiments of the invention are shown. In the figures, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may take the form of an entirely hardware embodiment, an entirely software embodiment (including firmware, resident software, micro-code, etc.), or an embodiment combining software and hardware aspects all generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that the function(s) noted in the blocks of the flowchart and/or block diagram illustrations may occur out of the order noted. For example, two blocks shown in succession may, in fact, be executed substantially concurrently or the blocks may sometimes be executed in the reverse order, depending on the functionality involved. It will also be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 1:
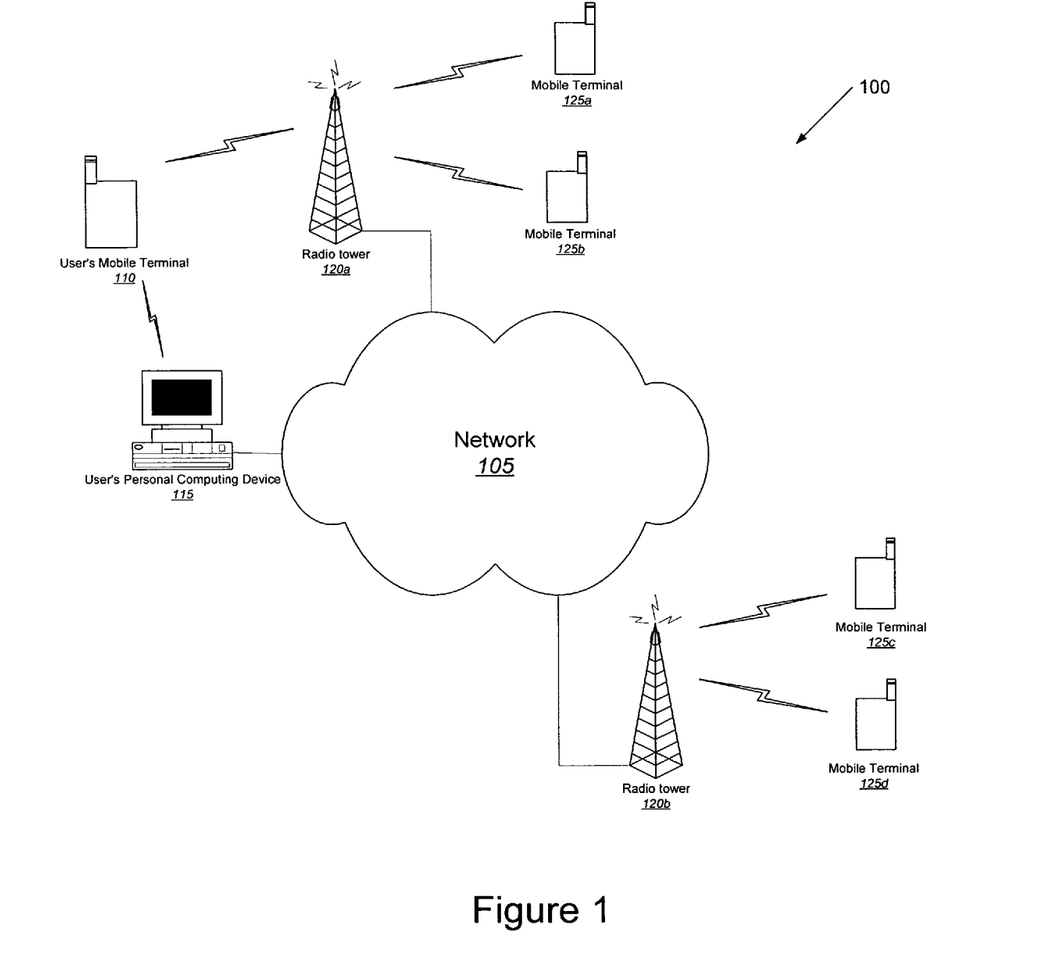
FIG. 1 is a block diagram of a system for updating user availability information according to some embodiments of the present invention.

For purposes of illustration, embodiments of the present invention are described herein with respect to FIGS. 1 through 4. Embodiments of the present invention provide methods, systems, and computer program products for updating user availability information, such as presence information, associated with a voice-call application. Referring now to FIG. 1, embodiments of the present invention may include a system 100 for updating user availability information. As shown in FIG. 1, a user's mobile terminal 110 is configured to communicate with other mobile terminals 125a-d using a voice-call application over a network 105. The network 105 includes radio towers 120a-b for wireless communication between the mobile terminals. The voice-call application may be a push-to-talk (PTT) application, such as push-to-talk over cellular (PoC), or other voice-based real-time or near-real time audio communications application.

As used herein, the term "mobile terminal" may include, but is not limited to, a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer that includes a radiotelephone or other transceiver. A mobile terminal may be configured to communicate using a voice-call application, such as a push-to-talk (PTT) application. A mobile terminal may further be configured to communicate according one or more other wireless communication protocols, including a wireless local area network (WLAN) protocol such as IEEE 802.11b-g and Bluetooth, and/or other communication protocols. Communication protocols as used herein may specify the information communicated, the timing, the frequency, the modulation, and/or the operations for setting-up and/or maintaining a communication connection.

The network 105 may represent a global network, such as the Internet, or other publicly accessible network. The network 105 may also, however, represent a wide area network, a local area network, an Intranet, or other private network, which may not be accessible by the general public. Furthermore, the network 105 may represent a combination of one or more wired and/or wireless public and/or private networks and/or virtual private networks (VPN).

For PTT applications, the network 105 may be a circuit-switched network or a packet-switched network. Packet switching may transfer data across the network in the same way Internet e-mail may be processed: the data may be broken into bits (packets), such that each packet may be transmitted separately across various networks and then reassembled before delivery. For example, PTT may be implemented in a Voice-over-IP ("VoIP") system, where voice communications are digitized and transmitted in small data packets over a communications network to the intended recipients. Packet switching may be highly efficient, as many packets can use the same transmission path, and may also be resilient, because packet-switching protocols may dynamically route around congested or downed network sectors. However, since the data is broken up, it may not arrive at its end point simultaneously, which may cause a slight transmission delay. This gap is unnoticeable in e-mail delivery, but can occasionally be apparent during a voice transmission. In contrast, with circuit switching, all the data may go directly to the call recipient in the correct order across a dedicated circuit, which may be utilized exclusively until the call ends.

Communication between the mobile terminal 110 and the other mobile terminals 125a-d using the voice-call application may depend in-part on availability information. As used herein, "availability information" or "presence information" may refer to the availability and/or willingness of a user of a voice-call application, for example, a push-to-talk (PTT) application, to send and/or receive communications using the application. This availability information may be displayed in the form of an icon in a contact or "buddy" list for a PTT application. For example, the contact list for a PTT application executing on the mobile terminal 110 may include mobile terminals 125a-d; however, an availability icon may indicate that only mobile terminals 125b and 125c are available and/or willing to receive communications from mobile terminal 110 using the PTT application.

A personal computing device 115 associated with the user of the mobile terminal 110 may also be connected to the network 105. For example, the personal computing device 115 may be a Personal Data Assistant (PDA) or a personal computer. The personal computing device 115 may include applications containing activity information about the user. As used herein, "activity information" may refer to information contained in an activity-related application, for example, a users' calendar, schedule, and/or task list. This activity information may be relevant to the user's availability information for a voice-call application. For example, if the user has a meeting scheduled on his activity application, this may indicate that the user may be unwilling and/or unavailable to receive PTT communications at his mobile terminal during the meeting. As such, the user's availability information may be automatically updated for the voice-call application based on activity information from the personal computing device 115. The personal computing device 115 may communicate this information to the mobile terminal 110 via the network 105. Alternatively, the personal computing device 115 may communicate directly with the mobile terminal 110 using a wireless data connection, such as infrared, Bluetooth, Wi-Fi, and/or other wireless protocol.

In some embodiments, the mobile terminal 110 itself may include applications (such as a calendar, schedule, and/or task list) containing activity information about the user. As such, the user's availability information may be automatically updated based on activity information from the mobile terminal 110.

Although FIG. 1 illustrates an exemplary communications network according to some embodiments of the present invention, it will be understood that the present invention is not limited to such configurations, but is intended to encompass any configuration capable of carrying out the operations described herein. For example, in some embodiments, the mobile terminals may be configured to provide and/or receive availability information to and/or from each other via a presence server configured to convey data between the mobile terminals over the network. The presence server may be configured to receive availability information associated with a particular user and provide the availability information to other users of mobile terminals (subscribers) that either subscribe to a presence service provided by the presence server or request availability data from the presence service. In some embodiments, the presence server may only provide availability information for a particular user based on the user's contact list.

Figure 2:
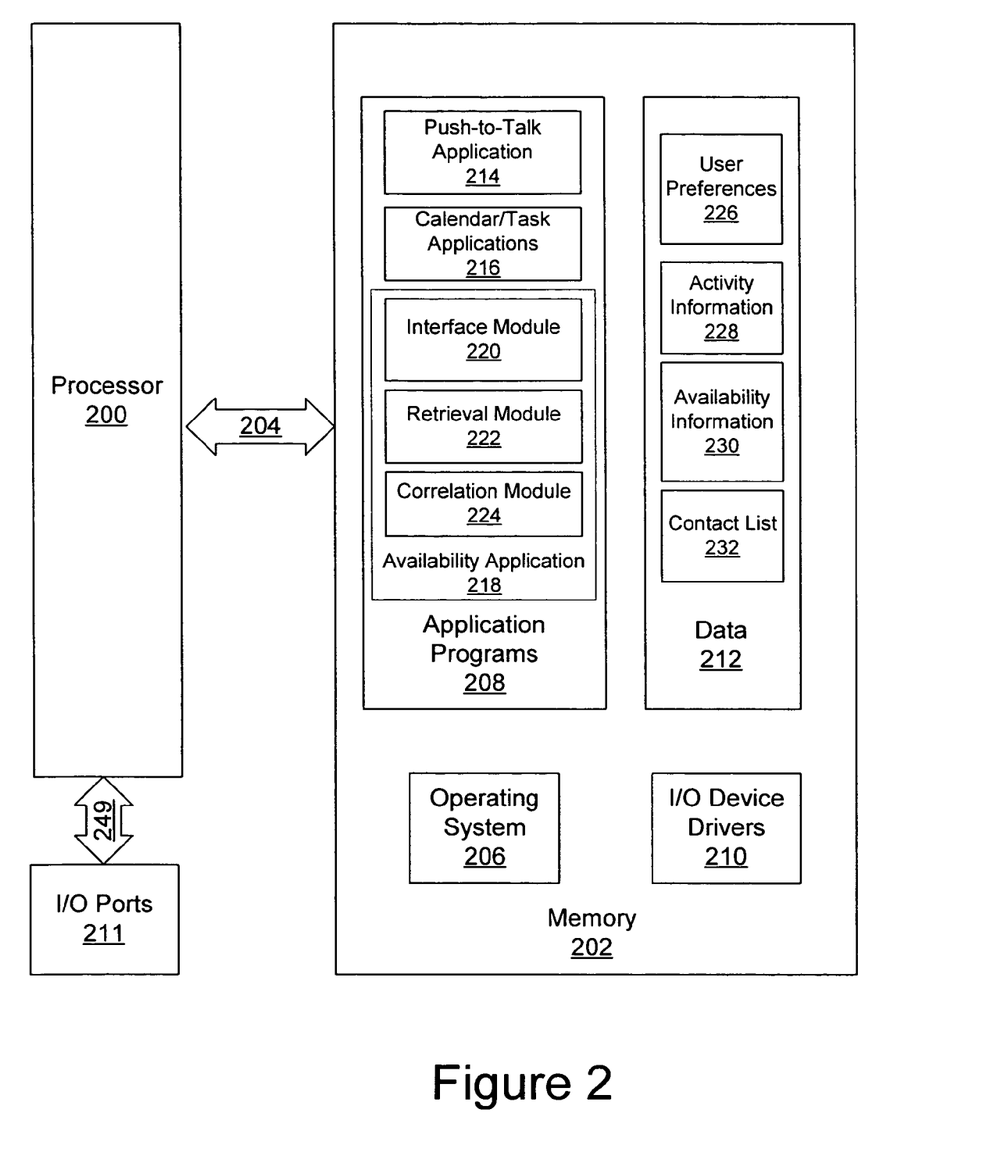
FIG. 2 is a block diagram illustrating a software architecture for updating availability information according to some embodiments of the present invention.

FIG. 2 illustrates a software architecture including a processor 200 and memory 202 that may be used in methods, systems, and computer program products for updating availability information in accordance with some embodiments of the present invention. The processor 200 communicates with the memory 202 via an address/data bus 204. The processor 200 also receives and/or transmits information to the data I/O ports 211 via a bus 249. The processor 200 may be, for example, a commercially available or custom microprocessor. The memory 202 is representative of the overall hierarchy of memory devices containing the software and data used to update availability information in voice-call applications in accordance with some embodiments of the present invention. The memory 202 may include, but is not limited to, the following types of devices: cache, ROM, PROM, EPROM, EEPROM, flash, SRAM, and DRAM.

As illustrated in FIG. 2, the memory 202 may include several categories of software and data: an operating system 206, applications programs 208, input/output (I/O) device drivers 210, and data 212. The operating system 206 controls the operation of the data processing system. In particular, the operating system 206 may manage the data processing system's resources and may coordinate execution of programs by the processor 200. The I/O device drivers 210 typically include software routines accessed through the operating system 206 by the application programs 208 to communicate with other components of the memory 202 and/or other devices via the I/O ports 211. The application programs 208 are illustrative of programs that implement the various features of a system according to embodiments of the present invention, and preferably include at least one application which supports operations for updating availability information in a voice-call application according to embodiments of the present invention. Finally, the data 212 represents the static and dynamic data used by the application programs 208, the operating system 206, the I/O device drivers 210, and other software programs that may reside in the memory 202.

As further shown in FIG. 2, the application programs 208 may include one or more voice-call applications, such as a push-to-talk (PTT) application 214, one or more activity applications, such as calendar/task applications 216, and an availability application 218. The availability application 218 may be configured to automatically retrieve user activity information from an activity application, such as the calendar/task applications 216, and update user availability information in a voice-call application, such as the push-to-talk (PTT) application 214, based on the retrieved activity information. The availability application 218 may include an interface module 220, a retrieval module 222, and a correlation module 224. The interface module 220 may be configured to obtain user preference information such that a selected subset of the user availability information may be distributed to other users based on the preference information. The retrieval module 222 may be configured to automatically retrieve user activity information from the calendar/task applications 216 executing separately from the PTT application 214. The correlation module 224 may be configured to correlate the retrieved activity information to PTT availability information, and update the user availability information in the PTT application 214 with the PTT availability information.

Still referring to FIG. 2, the data 212 may include data which may be used for updating user availability information in a voice-call application. In particular, the data 212 may include preference information 226, activity information 228, availability information 230, and contact lists 232. The contact lists 232 may include other users of the voice-call application with whom a user wishes to communicate. The contact lists 232 may also include availability information for each of the other listed users. The availability information 230 may include information related to the availability and/or willingness of a user of the voice-call application to send and/or receive communications using the application. The activity information 228 may include information about a user, such as schedule, appointments, etc., that may be relevant to the user's availability information. The activity information 228 may be retrieved from an activity-related application, such as the calendar/task applications 216. The preference information 226 may include correlation preferences for correlating the retrieved activity information 228 to availability information. For example, the correlation preferences may specify that activity information relating to the user's lunch appointment is to be mapped to particular availability information, such as "Away From Office." The preference information 226 may also include a respective level of trust and/or level of detail preference associated with each of the other users on the contact lists 226. For example, a more trusted party, such as the user's wife, may receive more information about the user's availability than a less trusted party, such as the user's boss. As such, a selected subset of the user availability information 230 may be distributed to the other users on the contact lists 226 based on the level of trust and/or level of detail preferences for each of the other users.

Although FIG. 2 illustrates an exemplary software architecture that may facilitate updating user availability information in a voice-call application, it will be understood that the present invention is not limited to such a configuration but is intended to encompass any configuration capable of carrying out the operations described herein. For example, while the present invention is described with reference to the availability application 218 as an application program 208, other configurations may also be utilized while still benefiting from the teachings of the present invention. For instance, the availability application 218 may also be incorporated into the operating system 206, the I/O device drivers 210, or other such logical division of the memory 202. Also, although the availability application 218, the push-to-talk application 214, and the calendar/task applications 216 are illustrated as being included in a single memory module, these applications may be distributed among different components of a communications system. For example, the push-to-talk application 214 and the availability application 218 may be included in the memory of a mobile terminal, while the calendar/task applications 216 may be included in the memory of a personal computer. Furthermore, the individual modules of the availability application 218 may also be distributed. For instance, the retrieval module 222 may be included in the memory of the personal computer, while the correlation module 224 may be included in the memory of the mobile terminal. Alternatively, the retrieval module 222 and the correlation module 224 may be included in a presence server. The presence server may be configured to retrieve activity information associated with a particular user, correlate the activity information to PTT availability information, and transmit the PTT availability information to other mobile terminals.

Figure 3:
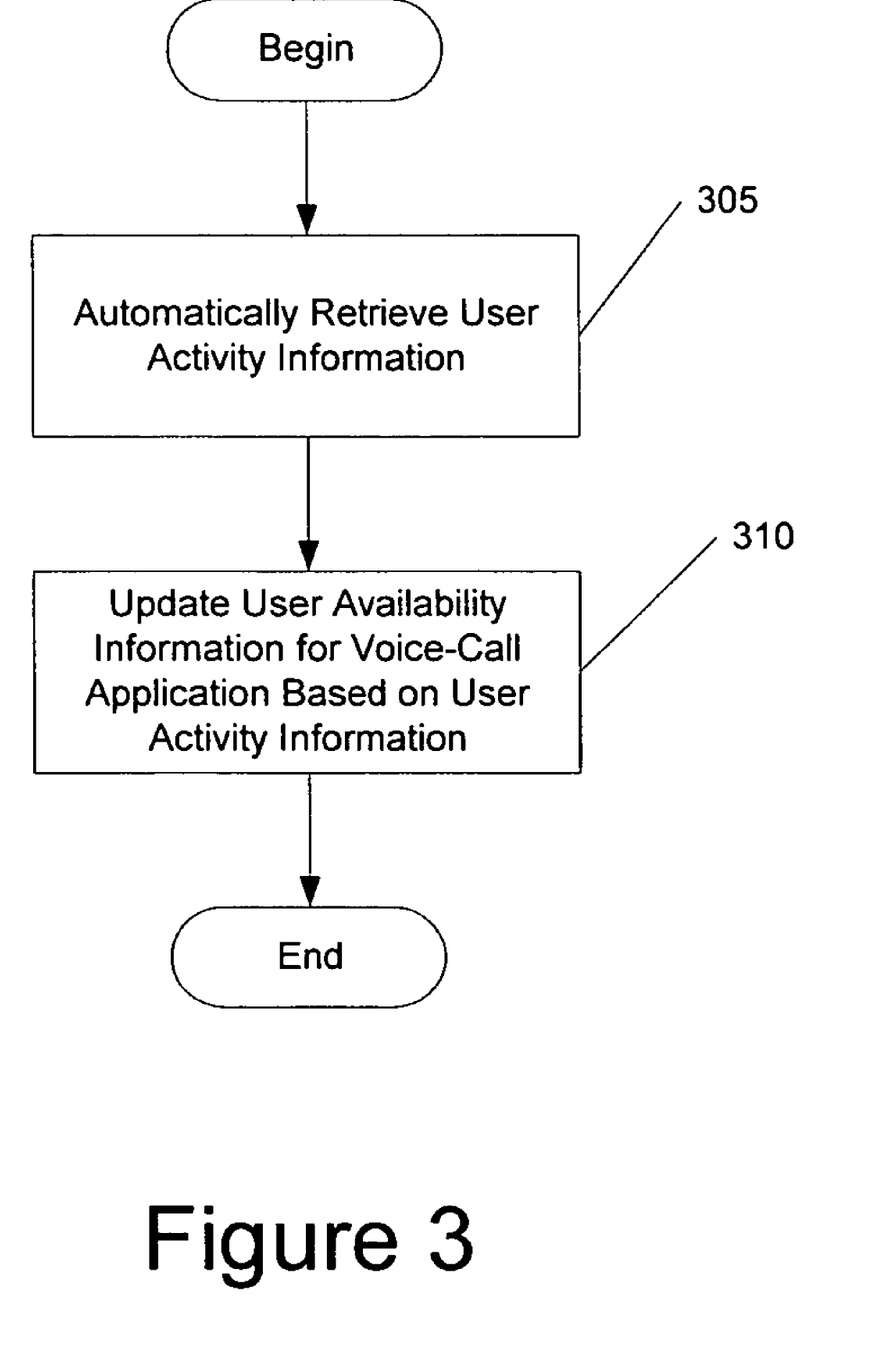
FIG. 3 is a flowchart illustrating operations for updating availability information according to some embodiments of the present invention.

Exemplary operations for updating user availability information in a voice-call application in accordance with some embodiments of the present invention will now be described with reference to the flowcharts of FIG. 3 and FIG. 4. Referring now to FIG. 3, operations begin at block 305 by automatically retrieving user activity information from an activity application. User activity information may refer to information about a user which may be contained in an activity application, such as a users' calendar, schedule, and/or task list. The user activity information may be relevant to user availability information. The user availability information may refer to the availability and/or willingness of a user of the voice-call application to send and/or receive communications. The user availability information is updated for the voice-call application based on the retrieved user activity information at block 310. In some embodiments, the voice-call application may be a push-to-talk (PTT) application, and the user availability information may be updated by correlating the retrieved activity information to PTT availability information and updating the user availability information with the PTT availability information. The user availability information may also be a PTT presence status indicator for the PTT application.

Figure 4:
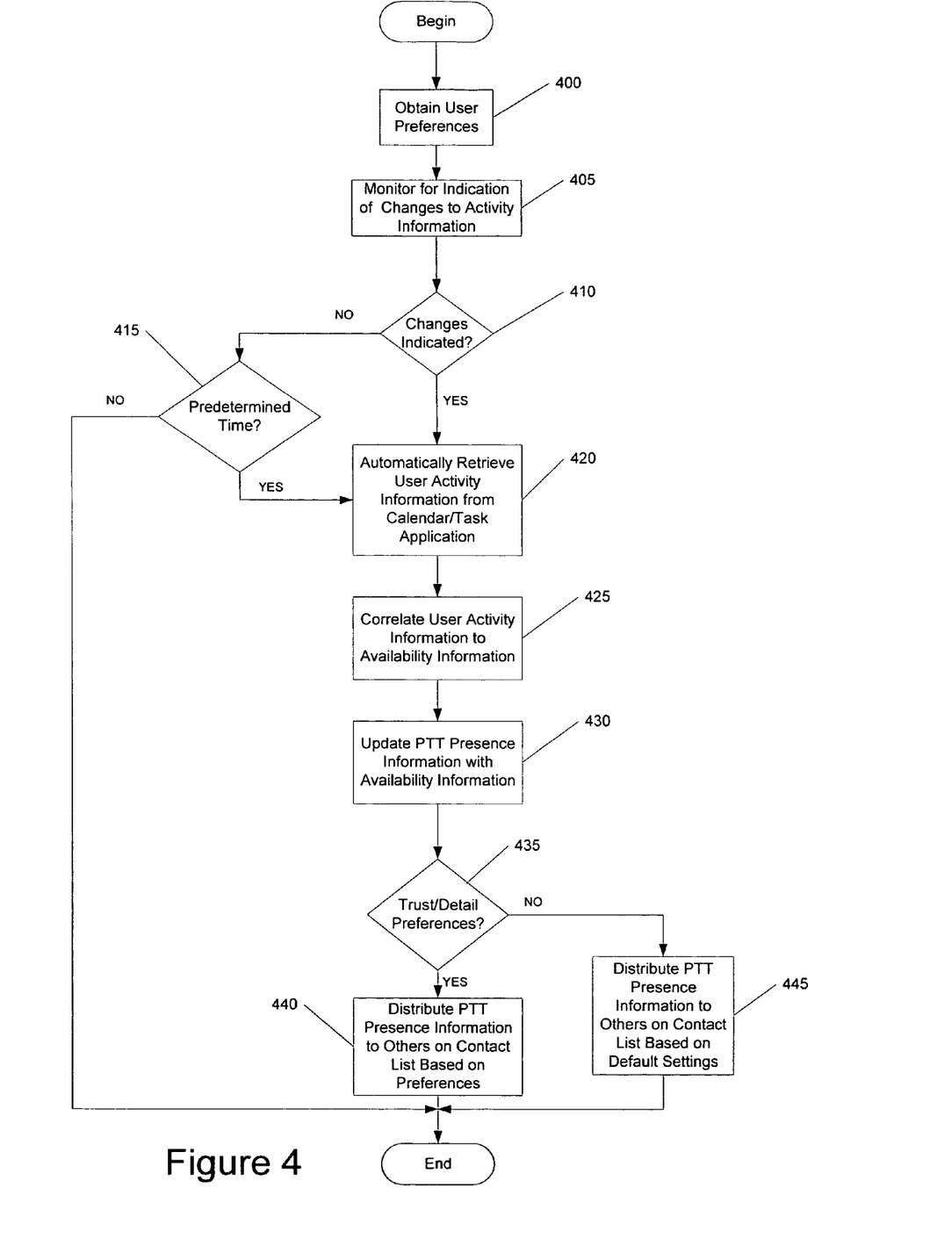
FIG. 4 is a flowchart illustrating detailed operations for updating availability information according to further embodiments of the present invention.

FIG. 4 illustrates detailed operations of an availability application, such as the availability application 218 of FIG. 2, for updating push-to-talk (PTT) presence information in a PTT application executing on a mobile terminal according to further embodiments of the present invention. Referring now to FIG. 4, operations begin at block 400 where user preference information is obtained. The user preference information may include a respective level of trust and/or level of detail preference associated with each of the other users listed in the user's contact list. The user preference information may also include correlation preferences for correlating certain activity information to particular presence information for the PTT application.

The availability application then monitors for an indication of changes to user activity information (block 405). If an indication of changes is received (block 410), user activity information is automatically retrieved from a calendar and/or task application (block 420), such as the calendar/task applications 216 of FIG. 2. The user activity information may also be retrieved if it is determined that a predetermined time has passed (block 415). The calendar and/or task application may be executing on a personal computer and/or on the mobile terminal itself. If the calendar and/or task application is executing on a personal computer, the retrieved activity information may be transmitted from the personal computer to the mobile terminal indirectly via a network, or directly using a wireless connection such as infrared, Bluetooth, Wi-Fi, and or other wireless protocol.

Still referring to FIG. 4, the retrieved activity information is correlated to availability information (block 425), and the PTT presence information is updated with the availability information (block 430). The retrieved activity information may be correlated to availability information using, for example, a lookup table. Also, any correlation preferences specified by the user may be used to correlate the retrieved activity information to availability information. The retrieved activity information may be correlated to current and/or future availability information, and the PTT presence information may be updated accordingly at a corresponding current and/or future time(s). The PTT presence information may be updated when the mobile terminal is in an active mode of operation and/or a standby mode of operation, so as to preclude the user from receiving PTT calls when the mobile terminal is in use for another call and/or when the mobile terminal is on but the user is otherwise busy. It is then determined whether any level of trust and/or level of detail preferences were specified for the other users listed in the user's contact list (block 435). If so, the PTT presence information is distributed to the users on the contact list according to the specified preference information (block 440). If no preference information is specified, the PTT presence information is distributed to the users on the contact list based on default settings (block 445).

Operations of a system for updating user availability information in a voice-call application in accordance with some embodiments of the present invention are illustrated by the following example. A corporate user of a push-to-talk (PTT) service accepts a meeting using Microsoft Outlook on his personal computer, and sets Outlook's 'Show Time As' field to 'Busy' for the duration of the meeting. The user then synchronizes his PTT-enabled cellular telephone with his personal computer. In response to a synchronization signal from the computer, the availability application on the PTT-enabled phone automatically retrieves the user's activity information from Outlook, including the time, duration, and other information relating to the scheduled meeting, as well as information about other scheduled activities.

The availability application then correlates the retrieved activity information to current and/or future availability information for the user. More particularly, the availability application maps the 'Busy' status of the 'Show Time As' field for the meeting scheduled in Outlook to a 'Do Not Disturb' status recognizable by the PTT application (according to a preference set by the user at an earlier time), and updates the user's PTT presence information to display this status for the duration of the meeting. When other members of the user's corporate team (who are included on the user's contact list) attempt to call him during the meeting using their PTT-enabled phones, they see the 'Do Not Disturb' status beside the user's name on their contact list and either leave the user a message or attempt to contact the user at a later time. Thus, the user's desire to not be disturbed by disruptive push-to-talk voice calls during the meeting (or other scheduled activity) is shared with all team members on his authorized contact list without the need for manual updates by the user, and without requiring the user to turn off his phone.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. The invention is defined by the following claims, with equivalents of the claims to be included therein.

That which is claimed is:

1. A method of updating user availability information in a voice-call application executing on a mobile terminal, comprising:

automatically retrieving user activity information from an activity application that has access to scheduling information for a user of the voice-call application, the user activity information comprising information indicating scheduled activities for the user; and updating the user availability information for the voice-call application based on the retrieved user activity information, the user availability information comprising information indicating the willingness of the user to send/receive communications: and distributing a selected subset of the user availability information to one or more other users, the selected subset of the user availability information comprising a level of detail that is based on user preference information specified by the user.

2. The method of claim 1, wherein the voice-call application is a push-to-talk (PTT) application, and wherein updating the user availability information comprises:

correlating the retrieved activity information to PTT availability information; and updating the user availability information with the PTT availability information.

3. The method of claim 2, wherein automatically retrieving user activity information comprises automatically retrieving user activity information from a calendar and/or task application executing separately from the PTT application.

4. The method of claim 2, wherein correlating comprises correlating the retrieved activity information to future PTT availability information, and wherein updating comprises updating the user availability information with the future PTT availability information at a corresponding future time.

5. The method of claim 2, wherein the activity application is executing on a personal computer, and wherein automatically retrieving the user activity information and updating the user availability information are performed by the mobile terminal 6. The method of claim 2, further comprising transmitting the PTT availability information to the mobile terminal, wherein the activity application is executing on a personal computer, and wherein automatically retrieving activity information and correlating the retrieved activity information to PTT availability information are performed by the personal computer.

7. The method of claim 2, further comprising transmitting the PTT availability information to the mobile terminal, wherein the activity application is executing on a personal computer, and wherein automatically retrieving activity information and correlating the retrieved activity information to PTT availability information are performed by a central server that is configured to communicate with the personal computer and the mobile terminal.

8. The method of claim 2, further comprising transmitting the retrieved activity information from a personal computer to the mobile terminal, wherein the activity application is executing on the personal computer, and wherein automatically retrieving user activity information is performed by the personal computer, and wherein updating the user availability information is performed by the mobile terminal.

9. The method of claim 2, wherein updating the user availability information comprises updating a PTT presence status indicator in the PTT application.

10. The method of claim 1, wherein updating the user availability information is performed when the mobile terminal is in an active mode of operation and/or a standby mode of operation.

11. The method of claim 1, further comprising:
obtaining the user preference information comprising a respective level of trust preference associated with each of the other users, and wherein distributing further comprises distributing the selected subset of the user availability information based on the respective level of trust preferences for each of the other users.

12. The method of claim 1, further comprising: obtaining the user preference information comprising correlation preferences, and wherein updating further comprises correlating the retrieved activity information to the user availability information based on the correlation preferences.

13. The method of claim 1, wherein automatically retrieving user activity information and updating the user availability information comprise automatically retrieving the user activity information and updating the user availability information responsive to at least one of a radio signal, an infrared signal, and a synchronization signal.

14. The method of claim 1, further comprising receiving an indication of changes to the user activity information, and wherein automatically retrieving the user activity information and updating the user availability information are responsive to the received indication.

15. The method of claim 1, wherein automatically retrieving the user activity information and updating the user availability information comprise automatically retrieving the user activity information and updating the user availability information at predetermined times.

16. A system for updating user availability information in a voice-call application executing on a mobile terminal, comprising:
an availability application configured to automatically retrieve user activity information from an activity application that has access to scheduling information for a user of the voice-call application, the user activity information comprising information indicating scheduled activities for a user, update the user availability information for the voice call application based on the retrieved activity information, the user availability information comprising information indicating the willingness of the user to send/receive communications, and distribute a selected subset of the user availability information to one or more other users, the selected subset of the user availability information comprising a level of detail that is based on user preference information specified by the user.

17. The system of claim 16, wherein the voice-call application is a push-to-talk (PTT) application, and wherein the availability application includes a correlation module configured to correlate the retrieved activity information to PTT availability information and update the user availability information with the PTT availability information.

18. The system of claim 17, wherein the availability application includes a retrieval module configured to automatically retrieve user activity information from a calendar and/or task application executing separately from the PTT application.

19. The system of claim 17, wherein the availability application is configured to retrieve the user activity information from an activity application executing on the mobile terminal and/or on a personal computer.

20. The system of claim 17, wherein the availability application is further configured to update the user availability information when the mobile terminal is in an active mode of operation and/or a standby mode of operation.

21. The system of claim 16, further comprising:
an interface module configured to obtain the user preference information comprising a respective level of trust preference associated with each of the other users,
wherein the availability application is configured to distribute the selected subset of the user availability information based on the respective level of trust preferences for each of the other users.

22. A system for updating user availability information in a voice-call application executing on a mobile terminal, comprising:
means for automatically retrieving user activity information from an activity application that has access to scheduling information for a user of the voice-call application, the user activity information comprising information indicating scheduled activities for the user;
means for updating the user availability information for the voice-call application based on the retrieved activity information, the user availability information comprising information indicating the willingness of the user to send/receive communications; and
means for distributing a selected subset of the user availability information to one or more other users, the selected subset of the user availability information comprising a level of detail that is based on user preference information specified by the user.

23. A computer readable storage medium having computer readable program code embodied therein for updating user availability information in a voice-call application executing on a mobile terminal, wherein:
the computer readable storage medium comprises computer readable program code that automatically retrieves user activity information from an activity application that has access to scheduling information for a user of the voice-call application, the user activity information comprising information indicating scheduled activities for the user;
the computer readable storage medium comprises computer readable program code that updates the user availability information for the voice-call application based on the retrieved activity information, the user availability information comprising information indicating the willingness of the user to send/receive communications; and the computer readable storage medium comprises computer readable program code that distributes a selected subset of the user availability information to one or more other users, the selected subset of the user availability information comprising a level of detail that is based on user preference information specified by the user.

24. The computer readable storage medium of claim 23, wherein the voice-call application is a push-to-talk (PTT) application, and wherein the computer readable program code that updates the user availability information comprises:

computer readable program code that correlates the retrieved activity information to PTT availability information; and computer readable program code that updates the user availability information with the PTT availability information.

25. The computer readable storage medium of claim 24, wherein the computer readable program code that correlates the retrieved activity information correlates the retrieved activity information to future PTT availability information, and wherein the computer readable program code that updates the user availability information updates the user availability information with the future PTT availability information at a corresponding future time.

26. The computer readable storage medium of claim 24, wherein the computer readable program code that automatically retrieves activity information comprises computer readable program code that automatically retrieves activity information from a calendar and/or task application executing separately from the PTT application.

27. The computer readable storage medium of claim 23, wherein the computer readable program code that updates the user availability information updates the user availability information when the mobile terminal is in an active mode of operation and/or a standby mode of operation.

28. A method of updating push-to-talk (PTT) presence information in a push-to-talk application executing on a mobile terminal, comprising:

obtaining user preference information;

automatically retrieving user activity information from a calendar and/or task application executing on a personal computer;

transmitting the retrieved activity information from the personal computer to the mobile terminal;

determining availability information based on the retrieved activity information;

updating the PTT presence information with the availability information; and distributing a selected subset of the PTT presence information to other users based on the preference information.

29. The computer readable storage medium of claim 23, wherein the computer readable storage medium further comprises computer readable program code that obtains user preference information comprising a respective level of trust preference associated with each of the other users, and wherein the computer readable program code that distributes the selected subset comprises computer readable program code that distributes the selected subset of the user availability information based on the respective level of trust preferences for each of the other users.

* * * * *

UNITED STATES PATENT AND TRADEMARK OFFICE
CERTIFICATE OF CORRECTION

PATENT NO. : 7,593,743 B2  Page 1 of 1
APPLICATION NO. : 11/003153
DATED : September 22, 2009
INVENTOR(S) : East It is certified that error appears in the above-identified patent and that said Letters Patent is hereby corrected as shown below:

Column 5, Lines 54 - 55: Please correct "contain, store, communicate, propagate, or transport the program" to read -- contain and/or store the program --

Column 5, Line 60: Please correct "apparatus, device, or propagation medium." to read -- apparatus or device. --

Column 5, Lines 62 - 63: Please delete "an electrical connection having one or more wires" after -- following: --

Column 5, Line 66: Please delete "an optical fiber," after -- (EPROM or Flash memory), --

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,593,743 B2
APPLICATION NO. : 11/003153
DATED : September 22, 2009
INVENTOR(S) : Allen M. East Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1124 days.

Signed and Sealed this

Twenty-eighth Day of September, 2010

David J. Kappos
*Director of the United States Patent and Trademark Office*